Jan. 1, 1957.  P. P. RUPPE  2,776,042
PROPELLING LINKAGE FOR TUBE TYPE CONVEYOR
Filed July 1, 1953  3 Sheets-Sheet 1

INVENTOR.
PETER P. RUPPE
BY
Barney, Kneller, Laughlin & Raisch
ATTORNEYS.

Jan. 1, 1957 P. P. RUPPE 2,776,042
PROPELLING LINKAGE FOR TUBE TYPE CONVEYOR
Filed July 1, 1953 3 Sheets-Sheet 2

INVENTOR.
PETER P. RUPPE
BY
ATTORNEYS.

Jan. 1, 1957 P. P. RUPPE 2,776,042
PROPELLING LINKAGE FOR TUBE TYPE CONVEYOR
Filed July 1, 1953 3 Sheets-Sheet 3
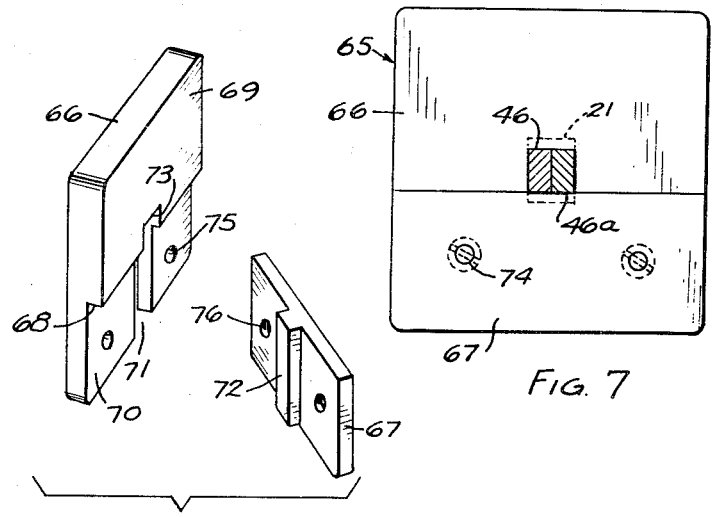
FIG. 6
FIG. 7
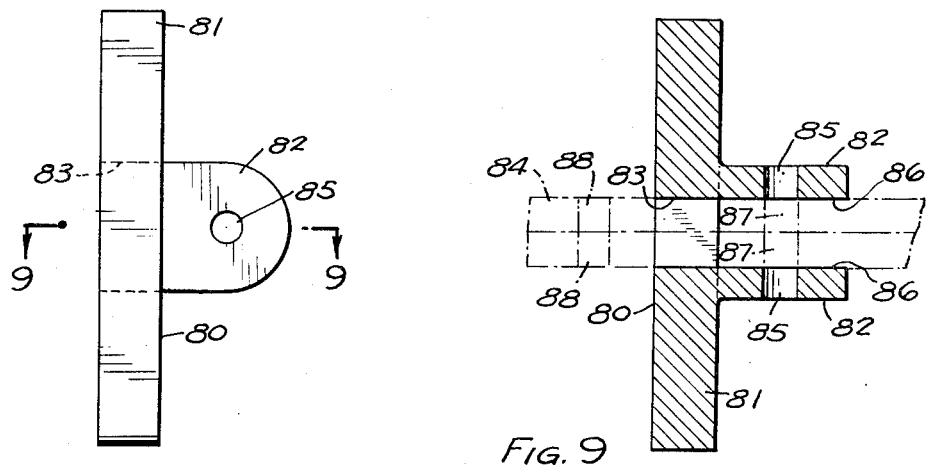
FIG. 8
FIG. 9
INVENTOR.
PETER P. RUPPE
BY
Barnes, Kisselle, Laughlin & Raisch
ATTORNEYS.

United States Patent Office 2,776,042
Patented Jan. 1, 1957

2,776,042
PROPELLING LINKAGE FOR TUBE TYPE CONVEYOR

Peter P. Ruppe, Grosse Pointe Woods, Mich.

Application July 1, 1953, Serial No. 365,316

6 Claims. (Cl. 198—176)

This invention relates to a tube type conveyor and is especially concerned with the linkage which connects and propels the pistons or the flights through the tube as well as with a new flight construction.

During the operation of a tube type conveyor there is a continual scraping of the edges of each piston or flight against the inner surfaces of the tube which in time wears away the flights and necessitates their replacement. This effect is heightened where the material being conveyed is of an abradant nature. Further, in conveyors utilizing round flights and a round tube there is a tangential contact between each flight and the tube and the same point on the periphery of each flight tends to remain continually in contact with the tube, and the concentrated wear at that point requires more frequent replacement of the flight. Another factor contributing to the wear on the flights is resistance of the linkage bending in following the curves in the conveyor tube.

It is an object of this invention to provide means for minimizing wear on the flights and to provide a simple, economically manufactured structure in which the flights may be easily and quickly replaced without disassembly and rebuilding of the operating linkage, thereby minimizing both the cost of maintenance and the loss of operating time in replacement of the flights.

In accordance with the invention the propelling linkage has a concatenate series of pairs of links, the pairs being alternately transversely spaced apart to accommodate a driving sprocket projection and abutted together and adapted to have a flight removably secured thereto. Adjacent pairs of links are secured together through pin and clevis connecting means which embodies two closely coupled joints. Each joint permits the adjacent pairs of links to be swivelled in one direction relatively to each other, and the axes of the joints are disposed perpendicularly to each other so that the linkage will readily conform to any relatively sharply curved path traced by the conveying tube. Several forms of the invention are shown in the accompanying drawings which may be briefly described as follows:

Fig. 6 is a perspective view showing another form of flight.

Fig. 7 is generally elevational showing the flight of Fig. 6 secured to a link.

Fig. 8 shows a third type of link in elevation.

Fig. 9 is a generally sectional view taken on line 9—9 of Fig. 8 and showing a portion of the propelling linkage.

Figure 2:
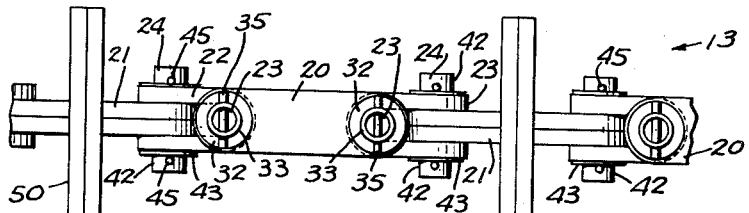
Fig. 2 is an elevational view of the propelling linkage and flights of this invention.
Figure 1:
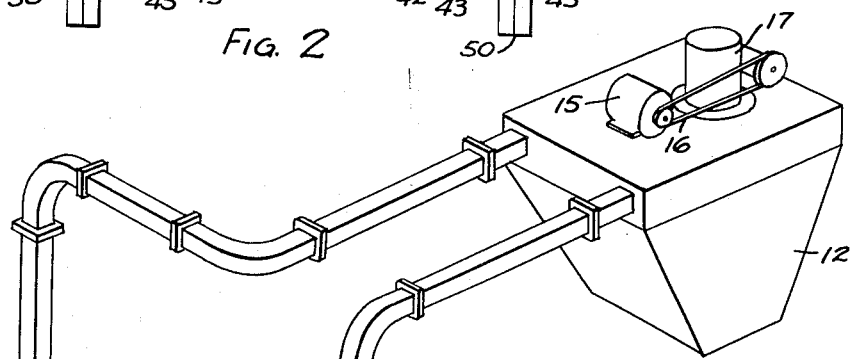
Fig. 1 shows generally a conveying system of a type with which this invention may be used.

A conveyor system of a type adapted for embodying this invention is shown generally in Fig. 1, and it includes a conveyor tube 10 and loading hopper 11, where the conveyor is loaded with the material to be transported and conveyer, and a discharge hopper 12 into which the material is discharged or unloaded. The propelling linkage shown generally in Fig. 2 is arranged in the tube and discharge hopper in the form of an endless chain. The linkage may conveniently be driven through the tube by a sprocket 14 mounted in the upper portion of the discharge hopper, the sprocket in turn being driven by such means as an electric motor 15 connected thereto through a belt 16 and a gear box 17. The propelling linkage is designed to travel easily through a tube such as that shown in Fig. 1 which follows a course curving in all directions and in which the curves may be relatively sharp.

Figure 4:
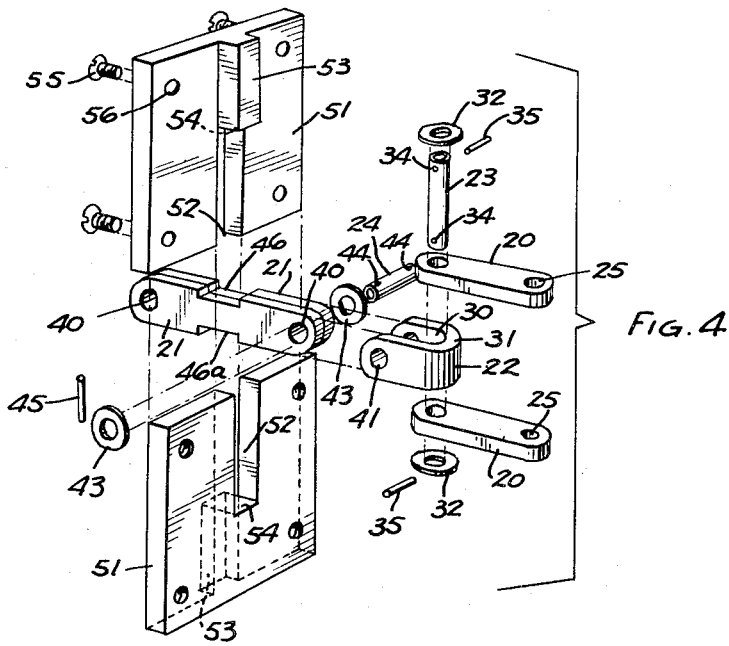
Fig. 4 is a perspective exploded view showing the individual parts of the linkage and flights.

The propelling linkage (Figs. 2 and 4) includes straight bar-shaped sprocket links 20 and straight bar-shaped flight links 21 arranged at alternate pairs and interconnected through U-shaped clevis links 22 and pintle members 23 and 24. The end portions of each sprocket link are apertured as shown at 25 and the closed end of the clevis link forms a port 30. One end of a sprocket link is pivotally secured to each side 31 of each clevis link by means of a pintle 23 extending through the aligned apertures 25 and port 30.

The pintle projects somewhat beyond the sprocket links and washers 32 are placed over the projections 33 (Fig. 2) and into engagement with the sprocket links. Each projection contains an opening 34, through which a locking pin 35 extends. The ends of the locking pins project out of the opening 34 to engage the washers 32 and thereby secure the pintles in place. The locking pins are preferably in the form of hollow sleeves held in circumferentially compressed condition by the walls of the openings 34 and thus are frictionally secured therein.

The end portions of each flight link 21 have apertures 40 therein and adjacent the ends of the legs of the clevis link have apertures 41 which are preferably of substantially the same diameter as the apertures 40. The pairs of flight links are disposed in side-by-side abutment and the end portions of the pairs are fitted nicely between the legs of the clevis link with the apertures 40 and 41 aligned. A pintle 24 projects through the aligned apertures, thereby pivotally securing the flight links to the clevis link.

The pintle 24 projects beyond the legs of the clevis link as shown at 42, and washers 43 are fitted onto the projections. Each projection has an opening 44 through which a locking pin 45 extends. These pins are preferably of the same type as the locking pins 34 and cooperate in the same manner with the adjacent washers to secure the pintle 24 in place.

The clevis link and pintles thus provide a connection between adjacent pairs of flight links and sprocket links, and this connection embodies two closely coupled pivoting joints. The axes of the pintles are substantially perpendicular to each other, thereby permitting relative flexure of adjacent pairs of links in two directions transversely of the longitudinal extent of the linkage.

Each flight link 21 has identical rectangular shaped notches or depressions 46 and 46a in its edges, and the notches in each pair of flight links are aligned. The notches are preferably located midway between the ends of the links.

Each flight or piston 50 comprises a pair of preferably identical, substantially flat square plates 51. Extending perpendicularly inwardly from the central part of one side of each plate 51 is a rectangular slot 52 which is of such a width that the combined thicknesses of the abutted flight links 21 will fit nicely therein. On one face of the plate 51 and in extension of the slot 52 is a lug or upset portion 53. The inner ends of the slot 52 and the lug 53 lie in a common plane providing the planar surface 54. Preferably, lug 53 terminates at the central portion of one side of the plate, its upset dimension is equal to the thickness of the plate proper, and it is of such a width as to fit nicely within the slot 52 of another plate 51.

Figure 5:
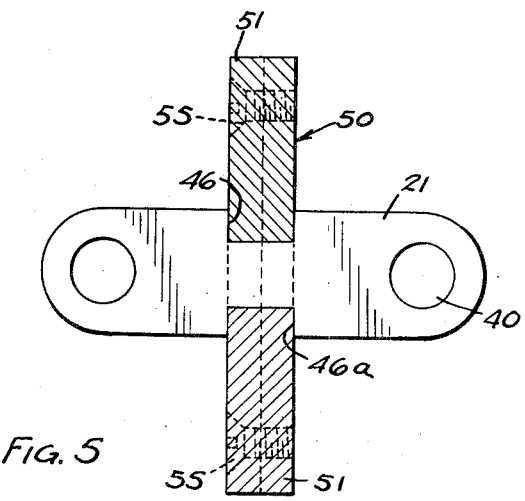
Fig. 5 is partly in elevation and partly in section showing one form of a flight.

To assemble a flight and secure it into operative position on the propelling linkage, the slot 52 of a plate 51 is slidably fitted over one edge of a pair of flight links and the planar surface 54 is seated on the inner face of the notch 46. When thus positioned, a portion of the plate including a portion of the slot 52 projects beyond the other edge of the flight links. A second plate is slidably mounted on the other edge of the flight links, the surface 54 thereof being seated on the inner surface of the other notch 46a. In so mounting the second plate, the lug 53 thereof slides into the slot 52 of the first plate and the slot 52 thereof engages the lug 53 of the first plate. The two plates are then secured firmly together in abutting and aligned relationship by such means as four bevel headed screws 55 extending through threaded openings 56 therein. A flight thus assembled presents a generally smooth planar surface on all its faces. The notches 46 and 46a are shaped and dimensioned to engage the plates 51 and lugs 53 nicely as illustrated in Fig. 5 in order to provide a substantially rigid connection between the flight links and the flights.

It is to be appreciated that in order to facilitate economy of manufacture and simplicity of assembly or disassembly or replacement of parts, various of the parts may be identically constructed. For example, the sprocket links and flight links may be identical except for the notches 46 in the latter and the washers 32 and 43 may be identical as may be the locking pins 35 and 45. Further, if desired, the flight links may be made as a single, relatively thick bar rather than as two abutted bars as in the preferred form of the invention.

Figure 3:
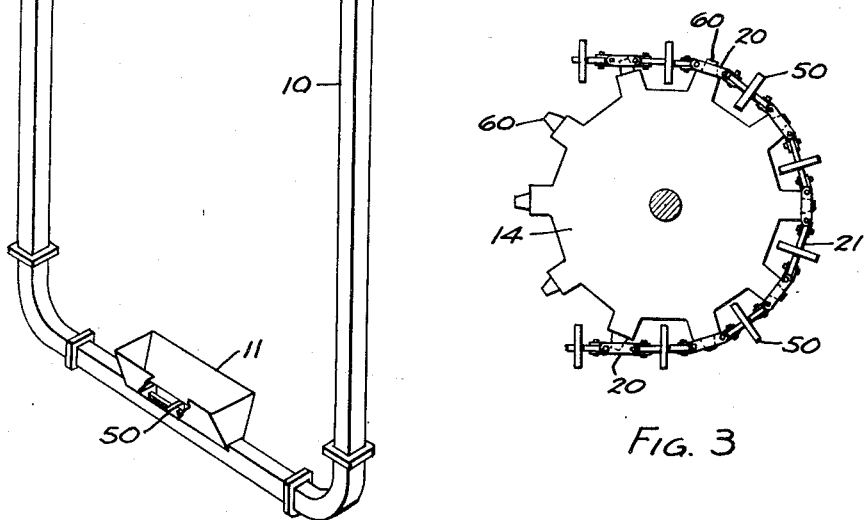
Fig. 3 shows the conveying linkage in engagement with a driving sprocket.

The propelling linkage with the flights secured thereto is disposed in the manner of an endless chain within the square conveying tube 10 (Fig. 1) and in engagement with driving sprocket 14 mounted inside of the discharge hopper 12. The pairs of sprocket links 20 are properly spaced apart by the clevis links 22 to permit the ends 60 of the teeth of the sprocket to project between them (Fig. 3). The sprocket 14 is recessed between its teeth as shown in order to accommodate the flights 50.

In use the electric motor 15, acting through the belt 16 and gear box 17, rotates the sprocket 14. The ends of the teeth 60 projecting between the sprocket links 20 engage the closed ends of the clevis links 21 and move the propelling linkage and flights through the conveyor tube 10. It is to be noted that the construction of the linkage and flights makes the direction of rotation of the sprocket immaterial. The construction is identical proceeding in either direction along the linkage from a point midway between any pair of the sprocket links. In this regard, it may also be noted that it is impossible to mount the linkage or the flights backward in the conveyor tube.

The material to be conveyed is loaded into a loading hopper 11 and from there feeds into the tube. A continual procession of flights or pistons 50 pushes the material through the tube to the discharge hopper 12. The flights leave the tube upon entering the hopper, and the material is deposited therein. As illustrated in Fig. 1, the conveyor tube may have a number of curves therein between the loading hopper and the discharge hopper. These curves may be more or less sharp and may be in various directions transversely of the linkage. The two directional flexure facilitated by the two closely coupled joints at each clevis link permits the linkage to conform to the curves with ease.

Because of friction between the flights and the tube there is a certain amount of wear on the flights which requires their eventual replacement and the wearing is hastened where the material conveyed is abradant in nature. It is an important part of this invention that the flights 50 may be removed and replaced quickly and easily without disassembly of any other part of the propelling linkage. This is done merely by removing the screws 55 and slidably disengaging the component plates 51 from each other and from the flight links 21. New plates 51 may then be slidably assembled as above described and secured in place by the screws 55. No other part of the linkage need be disturbed. Flights may thus be removed and replaced with minimal effort, expense of the loss of operating time.

In a modified form of the invention shown in Figs. 6 and 7 the flight 65 comprises interengaging plates 66 and 67. The plate 66 is square and has one substantially planar face. Its opposite face is stepped as at 68 to form the surfaces 69 and 70. A rectangular slot 71 extends perpendicularly inward from the central part of a side of the plate 66. This slot transverses the surface 69, intersects the step at right angles, penetrates the surface 70, and is of such a width as to accommodate nicely the combined thicknesses of the abutted flight links 21. Preferably, the height of the step is equal to half of the all-over thickness of the plate.

The plate 67 has the same shape as the surface 70 and its thickness equals the height of the step 68. An upset portion or lug 72 extends across the plate 67 at right angles to the sides thereof, is shaped to fit nicely within the slot 71, and its height equals the thickness of the plate 67 proper.

The flight 65 is assembled in operative position on the linkage by slidably fitting the slot 71 over the flight links 21 so that the end 73 of the slot is seated on the inner surface of the notch 46. The step 68 is then in co-planar relation with the inner surface of the other notch 46a. The plate 67 is then abutted against the surface 70 of the plate 66 with the lug 72 disposed within the slot 71 and with one side of the plate 67 abutting the step 68. In this position one end of the lug 72 and a portion of one side of the plate 67 engage the inner face of the notch 46a. The plates 66 and 67 are secured together by such means as two bevel-headed screws 74 extending through threaded openings 75 and 76 therein.

Here again the flight presents a generally smooth planar surface on all of its faces and there is a substantially rigid connection between the flight and the flight link. Moreover, only two screws need be removed in order to replace this form of the flight.

In another modification of the invention the flights 80 are of monolithic structure, having a plate portion 81 with members 82 projecting perpendicularly from one face thereof. An aperture 83 extends through the plate 81 and is shaped to nicely accommodate the flight links 84. The members 82 have openings 85 therein, and the inner surfaces 86 of the members are preferably co-planar with the side walls of the aperture 83 as shown in Fig. 9. The flight links 84 are without notches but have openings 87 which are aligned with the openings 85 in the members 82 of the flight. The flight links 84 extend through the aperture 83 and the flight 80 is secured thereto by such means as a pin (not shown) extending through the aligned openings 85 and 87. The flight links are provided with openings 88 through which the pintles 24 may extend, thereby securing the flight links to the adjacent clevis links 22.

I claim:

1. In a conveyor of the type having a tube with movable linkage therein for propelling material therethrough, propelling linkage comprising, a series of pairs of sprocket links and flight links pivotally joined in alternate arrangement, each pair of sprockets links being spaced apart to receive a tooth of a driving sprocket, each flight link having side portions and edge portions, the central zone of each edge portion being cut away generally rectangularly to provide a recessed surface, said recessed surface being substantially parallel to said edge portion, the ends of the cut away portions constituting shoulders, each pair of flight links being abutted together side by side with said recessed surfaces in alignment and a flight for propelling material through the tube associated with each pair of flight links, each flight comprising two plates, one plate having a slot defined by side walls and an end wall, the side walls engaging the exposed side portions of a pair of abutted flight links and the end walls seating on one pair of aligned recessed surfaces, the other plate having a lug thereon fitting within said slot and seating on the other pair of aligned recessed surfaces, said shoulders engaging opposite surfaces of said flights, said plates being slidably engageable with each other and with said flight links to facilitate their easy removal and replacement and means securing the plates in interfacial engagement, whereby said flight is secured to said links.

2. In a conveyor of the type having a tube with movable linkage therein for propelling material therethrough, propelling linkage comprising, a series of pairs of sprocket links and flight links pivotally joined in alternate arrangement, each pair of sprocket links being spaced apart to receive a tooth of a driving sprocket, each flight link having side portions and edge portions, the central zone of each edge portion being cut away generally rectangularly to provide a recessed surface, said recessed surface being substantially parallel to said edge portion, the ends of the cut away portions constituting shoulders, each pair of flight links being abutted together side by side with said recessed surfaces in alignment, and a flight for propelling material through the tube associated with each pair of flight links, each flight comprising two plates having substantially planar faces, each plate having a lug on one face and having a slot therein defined by side walls and an end wall, the side walls of the slot in each plate removably embracing the exposed side portions of a pair of abutted flight links, the end walls of the slots seating on opposite pairs of aligned recessed surfaces, the lug on each plate fitting within the slot of the other plate and said lugs seating on said opposite pairs of recessed surfaces, each flight having a thickness substantially equal to the length of said aligned recess surfaces, said shoulders engaging opposite surfaces of said flights, said plates being slidably engageable with each other and with said flight links to facilitate their easy removal and replacement, and means securing the plates in interfacial engagement, whereby said flight is secured to said links.

3. The conveyor defined in claim 2 wherein said plates have substantially identical construction.

4. The conveyor defined in claim 2 wherein said lug and slot on each of said plates extend generally perpendicularly inwardly from opposite sides of the plate and lie in extension of each other, and said inner end of said lug and said end wall of said slot lie in substantially the same plane.

5. In a conveyor of the type having a tube with movable linkage therein for propelling material therethrough, propelling linkage comprising, a series of pairs of sprocket links and flight links pivotally joined in alternate arrangement, each pair of sprocket links being spaced apart to receive a tooth of a driving sprocket, each flight link having side portions and edge portions, the central zone of each edge portion being cut away generally rectangularly to provide a recessed surface, said recessed surface being substantially parallel to said edge portion, the ends of the cut away portions constituting shoulders, each pair of flight links being abutted together side by side with said recessed surfaces in alignment, and a flight for propelling material through the tube associated with each pair of flight links, each flight comprising two plates, one plate having a face with two substantially planar portions, one portion being axially recessed relatively to the other portion, said plate having a slot therein defined by side walls and an end wall, the side walls engaging the exposed side portions of a pair of abutted flight links and the end wall seating against one pair of aligned recessed surfaces, the other plate having a substantially flat face with a lug thereon, said substantially flat face engaging said axially recessed portion of the first-mentioned plate with said lug fitting within said slot and seating against the other pair of the recessed surfaces, each flight having a thickness substantially equal to the length of said aligned recessed surfaces, said shoulders engaging opposite surfaces of said flights, said plates being slidably engageable with each other and with said flight links to facilitate their easy removal and replacement, and means securing the plates in interfacial engagement, whereby said flight is secured to said links.

6. The conveyor defined in claim 5 wherein said substantially planar portions of each of said plates are defined by a step and said slot traverses one of said portions and said step.

References Cited in the file of this patent

UNITED STATES PATENTS

| | | |
|---|---|---|
| 371,695 | McNeill | Oct. 18, 1887 |
| 501,289 | Miller | July 11, 1893 |
| 811,190 | Webster | Jan. 30, 1906 |
| 1,113,309 | Coldren | Oct. 13, 1914 |
| 1,629,515 | Lomando | May 24, 1927 |
| 1,860,597 | Renold | May 31, 1932 |
| 2,110,204 | Davis | Mar. 8, 1938 |
| 2,460,447 | Clarkson | Feb. 1, 1949 |
| 2,564,688 | Hapman | Aug. 21, 1951 |
| 2,571,444 | Hapman | Oct. 16, 1951 |